(12) United States Patent
Le Biez et al.

(10) Patent No.: US 12,065,387 B2
(45) Date of Patent: Aug. 20, 2024

(54) METHOD FOR MANUFACTURING A POROUS ABRADABLE COATING MADE OF CERAMIC MATERIAL

(71) Applicant: SAFRAN AIRCRAFT ENGINES, Paris (FR)

(72) Inventors: Philippe Charles Alain Le Biez, Moissy-Cramayel (FR); Nicolas Droz, Moissy-Cramayel (FR); Ludovic Philippe Liais, Moissy-Cramayel (FR); Serge Georges Vladimir Selezneff, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 616 days.

(21) Appl. No.: 17/284,295

(22) PCT Filed: Oct. 9, 2019

(86) PCT No.: PCT/FR2019/052394
§ 371 (c)(1),
(2) Date: Apr. 9, 2021

(87) PCT Pub. No.: WO2020/074828
PCT Pub. Date: Apr. 16, 2020

(65) Prior Publication Data
US 2021/0340069 A1    Nov. 4, 2021

(30) Foreign Application Priority Data

Oct. 11, 2018    (FR) ...................................... 18 59435

(51) Int. Cl.
*C04B 41/45*    (2006.01)
*C04B 41/50*    (2006.01)

(52) U.S. Cl.
CPC ...... *C04B 41/4505* (2013.01); *C04B 41/4582* (2013.01); *C04B 41/5027* (2013.01)

(58) Field of Classification Search
None
See application file for complete search history.

(56) References Cited

U.S. PATENT DOCUMENTS

| 2004/0137259 A1 | 7/2004 | Pabla et al. |
| 2011/0103940 A1 | 5/2011 | Duval et al. |

(Continued)

FOREIGN PATENT DOCUMENTS

| CN | 1899999 A | 1/2007 |
| CN | 102209691 A | 10/2011 |

(Continued)

OTHER PUBLICATIONS

Combined Chinse Office Action issued Apr. 24, 2022 in Chinese Patent Application No. 201980068428.0 (with partial English translation), 9 pages.

(Continued)

*Primary Examiner* — Alexander M Weddle
(74) *Attorney, Agent, or Firm* — Oblon, McClelland, Maier & Neustadt, L.L.P.

(57) ABSTRACT

A process for manufacturing a porous abradable coating includes: filling a mold with hollow glass or thermosetting polymer beads and a slurry; and sintering heat treatment to obtain a ceramic layer with pores. A maximum sintering temperature of the green body of the ceramic part is either higher than the melting temperature of the hollow glass beads so that at the end of the sintering heat treatment the hollow glass beads are melted, or higher than the decomposition temperature of the hollow thermosetting polymer beads so that at the end of the sintering heat treatment the hollow thermosetting polymer beads are decomposed.

14 Claims, 3 Drawing Sheets

(56) References Cited

U.S. PATENT DOCUMENTS

| | | |
|---|---|---|
| 2015/0211382 A1 | 7/2015 | Podgorski et al. |
| 2015/0275679 A1 | 10/2015 | Strock |
| 2018/0223678 A1 | 8/2018 | Strock |
| 2019/0309651 A1 | 10/2019 | Podgorski et al. |

FOREIGN PATENT DOCUMENTS

| | | | |
|---|---|---|---|
| CN | 102781663 A | 11/2012 | |
| CN | 104018208 A | 9/2014 | |
| CN | 105889328 A | 8/2016 | |
| CN | 112888666 A | 6/2021 | |
| DE | 10 2010 046 370 A1 | 3/2012 | |
| EP | 2 317 079 A2 | 5/2011 | |
| EP | 2 924 242 A1 | 9/2015 | |
| FR | 2 994 397 A1 | 2/2014 | |
| FR | 3041631 A1 * | 3/2017 | ............. C04B 35/10 |

OTHER PUBLICATIONS

International Search Report issued Jan. 21, 2020 in PCT/FR2019/052394 filed Oct. 9, 2019, 2 pages.

Preliminary French Search Report issued Jul. 18, 2019 in French Patent Application No. 1859435 filed Oct. 11, 2018, 3 pages (with Translation of Category).

\* cited by examiner

METHOD FOR MANUFACTURING A POROUS ABRADABLE COATING MADE OF CERAMIC MATERIAL

BACKGROUND OF THE INVENTION

The present disclosure relates to a porous ceramic coating, in particular an abradable coating for a turbomachine part, and its manufacturing process.

Many parts of turbomachines, as well as parts of turbojet nozzles, are today provided with coatings. "Coating" refers to a substantially continuous layer of material, this layer being interposed between the part it covers and the fluid flowing through the turbomachine or nozzle. A coating may comprise a different material than the material of the part it covers. A coating may also be divided into several sub-elements that, together, cover the part.

In many rotating machines, it is now known to provide the stator ring with abradable tracks opposite the top of the rotor blades. Such tracks are made using so-called "abradable" materials which, when they come into contact with the rotating blades, wear more easily than the latter. This ensures a minimum clearance between the rotor and the stator, improving the performance of the rotating machine, without risking damage to the blades if they rub against the stator. On the contrary, such friction erodes the abradable track, which makes it possible to automatically adjust the diameter of the stator ring as close as possible to the rotor. Such abradable tracks are therefore often used in turbomachine compressors.

On the other hand, their use is rarer in the turbines of such turbomachines, and especially in high-pressure turbines in which extreme physicochemical and thermal conditions prevail.

Indeed, the exhaust gases from the combustion chamber enter the high-pressure turbine at very high temperature and pressure levels, which leads to premature wear of the conventional abradable tracks.

Therefore, in order to protect the stator ring of the turbine, it is often preferable to provide it with a coating of the thermal barrier type whose materials and high density, too great for the coating to be effectively abradable, protect the ring against erosion and corrosion.

However, it is naturally understood that, in such a case, the integrity of the blades is no longer ensured in case of contact with the stator, which necessitates the provision of a larger clearance between the rotor and the stator and therefore increases the leakage rate at the top of the blades and thus reduces the performance of the turbine.

Furthermore, due to the point friction with the blades and the heat of the exhaust gases, the coating may be damaged and provide less protection for the stator.

Coatings obtained by thermal spraying of a powder composed of a metallic part made of an aluminum-silicon alloy and an organic part made of a resin, the resin being for example a polyester resin, are known.

A disadvantage of these coatings is that aluminum is susceptible to self-ignition, and thus deflagration, phenomena during compressor operation. These phenomena may lead to accelerated wear of the abradable coating and the surrounding parts in the turbomachine.

In order to reduce the risk of deflagration, the turbomachine comprises a relatively complex cooling system, which increases the production costs and/or makes the assembly of such a turbomachine relatively complex.

Abradable ceramic coatings are also known, these ceramic coatings are made abradable by incorporating porosity into the ceramic material.

These ceramic coatings are generally obtained by thermal spraying a mixture of ceramic powder and a polymer, such as a polyester or polyamide. The polymer is then decomposed by pyrolysis to form a porous ceramic coating.

However, the total porosity of such coatings is generally limited to about 30% by volume, which limits their ability to be eroded by the rotor blades.

It may also be desired to form porous abradable coating plates, plates which are then attached to the stator. These plates are not obtained by thermal spraying and their porosity is relatively low.

There is thus a need for abradable turbomachine coatings that are non-explosive and have relatively high porosity, these coatings not being obtained by thermal spraying.

SUBJECT MATTER AND SUMMARY OF THE INVENTION

The present disclosure aims to remedy at least part of these drawbacks and to address at least some or all of these needs.

To this end, the present disclosure relates to a process for manufacturing a porous abradable ceramic coating comprising a layer of ceramic material having pores, the process comprising the following steps:
- at least partial filling of a mold with hollow glass or thermosetting polymer beads;
- filling the mold with a slurry;
- filtration and discharge of a solvent from the slurry so that the mold contains a green body of the ceramic part comprising the hollow glass or thermosetting polymer beads;
- sintering heat treatment of the green body of the ceramic part to obtain the ceramic layer with pores, a maximum sintering temperature of the ceramic part green body being either higher than the melting temperature of the hollow glass beads so that at the end of the sintering heat treatment, the hollow glass beads are melted, or higher than the decomposition temperature of the hollow thermosetting polymer beads so that at the end of the sintering heat treatment the hollow thermosetting polymer beads are decomposed.

"Glass" means an amorphous material that exhibits a glass transition phenomenon. Typically, glass comprises silica or a silica-based compound.

"Thermosetting polymer" means a material obtained by an irreversible polymerization process. The decomposition of a thermosetting polymer is achieved by pyrolysis of the thermosetting polymer.

"Slurry" means a suspension of ceramic particles in a liquid. When sintered, the slurry will form a ceramic material. The liquid may be water or an organic liquid. The slurry may include compounds other than the liquid and the ceramic particles. In a known way, a slurry may comprise a mixture of different powders. It may also include additives. These additives may for example include wetting agents, anti-foaming agents, deflocculants, flocculants, coagulants, binders, lubricants and/or plasticizers. This list is of course non-exhaustive.

The porous abradable ceramic coating is thus obtained by using a slurry from which the solvent is discharged and filtered.

"Ceramic material" means an inorganic, non-metallic material which has undergone a thermal sintering treatment in order to consolidate the material. In particular, a ceramic material is a technical ceramic material, i.e., a material with good mechanical strength at very high temperatures, such as 1000° C. (degrees Celsius), and comprising ceramic materials based in particular on oxides, carbides and/or nitrides. Indeed, at higher porosity rates, the erosion of the abradable coating becomes too great because generally, the increase of the porosity rate is at the expense of the consolidation of the coating.

When the sintering heat treatment is complete, a porous abradable ceramic coating is obtained, the pores of which include a small amount of glass when hollow glass beads have been used. The beads being hollow glass beads, the bead wall is relatively thin and the amount of glass remaining in the pores is relatively small and dose not risk damaging the components of the turbomachine.

When the porous abradable coating is eroded, these glass masses are small enough and are not likely to clog ducts, such as ventilation ducts.

As examples of hollow glass beads, mention may be made of glass beads made of borosilicate glass, soda-lime glass, lead glass, also known as crystal glass, silica glass or aluminosilicate glass.

When hollow thermosetting polymer beads are used, the thermosetting polymer decomposes.

As an example of hollow thermosetting polymer beads, mention may be made of phenolic resin microballoons, the decomposition temperature of which starts at about 200° C. and is complete at 500° C.

The glass transition temperature is generally comprised between 550° C. and 600° C. for borosilicate glasses; between 450° C. and 480° C. for soda-lime glasses; between 400° C. and 420° C. for lead glasses; between 1300° C. and 1400° C. for aluminosilicate glasses and between 900 and 1300° C. for silica glass.

Thus obtained is a ceramic material with pores and thus a porous abradable ceramic coating that may be easily abraded by rubbing a part against the abradable coating, the part rubbing against the abradable coating being damage little if at all.

The choice of material for the hollow glass beads and the ceramic material is made according to the operating temperatures of the porous abradable coating and the glass transition temperature of the hollow glass beads. Thus, for a given operating temperature, a type of ceramic material is selected. Depending on this ceramic material, hollow glass beads with a glass transition temperature comprised between the final sintering temperature of the ceramic material and a sintering temperature allowing partial consolidation of the ceramic material are selected.

In some embodiments, the heat treatment comprises at least two sintering stages, a first sintering stage at a temperature below a glass transition temperature of the hollow glass beads or below the decomposition temperature of the hollow thermosetting polymer beads to form a partially consolidated ceramic part and a second sintering stage at a temperature above the glass transition temperature of the hollow glass beads to melt the hollow glass beads or above the decomposition temperature of the hollow thermosetting polymer beads to decompose the hollow thermosetting polymer beads.

The temperature of the first sintering stage being lower than the glass transition temperature of the hollow glass beads, the hollow glass beads in the green body of the ceramic part do not soften during the pre-sintering of the green body of the ceramic part. The structure formed by the hollow glass beads does not collapse and the green body of the ceramic part undergoes, during this first sintering stage, a first consolidation.

Thus, at the end of the first sintering stage, the structure formed by the hollow glass or thermosetting polymer beads is not deformed and a partial consolidation of the ceramic green is obtained.

During the second sintering stage, the temperature being higher than the glass transition temperature of the hollow glass beads, the consolidation of the ceramic part continues and the hollow glass beads soften.

As the hollow glass beads soften, they leave cavities in the ceramic material. These cavities will form the porosity of the porous abradable coating. Thus, when the hollow glass beads melt, the ceramic material is already sufficiently consolidated and the cavities left by the hollow glass beads are not filled by the ceramic material.

When the hollow beads are made of thermosetting polymer, during the second sintering stage, the temperature being higher than the decomposition temperature of the hollow thermosetting polymer beads, the hollow thermosetting polymer beads decompose to form mainly carbonaceous residues and gas and the consolidation of the ceramic part continues. Thus, when the hollow thermosetting polymer beads decompose, the ceramic material is already sufficiently consolidated and the cavities left by the hollow thermosetting polymer beads are not filled by the ceramic material.

In some embodiments, the diameter of the hollow glass or thermosetting polymer beads is greater than or equal to 800 nm, preferably greater than or equal to 1 µm, more preferably greater than or equal to 10 µm and less than or equal to 500 µm, preferably less than or equal to 400 µm, more preferably less than or equal to 300 µm.

The size of the pores in the ceramic layer may thus be modified. The diameter of the hollow glass or thermosetting polymer beads may also be selected according to the type of ceramic material. For example, for oxide-based ceramic materials, hollow beads with a diameter between 10 µm and 300 µm may be selected.

In some embodiments, during the at least partial filling of the mold with the hollow glass or thermosetting polymer beads, the hollow glass or thermosetting polymer beads are disposed in a mesh having a mesh size to contain the hollow glass or thermosetting polymer beads and to allow the slurry to pass through, the mesh having a decomposition temperature below a final sintering temperature.

By virtue of the mesh, it is easy to contain all the hollow glass or thermosetting polymer beads in the mold and to ensure a good distribution of the hollow glass or thermosetting polymer beads even when filling the mold with the slurry. The mesh size of the mesh is such that the hollow glass or thermosetting polymer beads may not escape from the mesh, i.e., the mesh size is smaller than the diameter of the hollow glass or thermosetting polymer beads. However, the mesh size of the mesh allows the slurry to seep between the hollow glass or thermosetting polymer beads, and more particularly into the spaces formed between the hollow glass or thermosetting polymer beads.

Furthermore, the mesh may be flexible and may therefore be easily adapted to the shape of the mold.

In some embodiments, the mesh may be made of a material comprising a nylon, a polyimide or a polyamide.

These materials have the advantage of decomposition temperatures that are lower than the final sintering temperature. Thus, at the end of the sintering process, the mesh is decomposed and at most traces of carbon remain in the porous abradable ceramic coating obtained at the end of the sintering heat treatment.

In some embodiments, the decomposition temperature of the mesh is higher than the temperature of the first temperature stage.

In some embodiments, during the at least partial filling of the mold with the hollow glass or thermosetting polymer beads, the hollow glass or thermosetting polymer beads are disposed in the mold with a solvent to agglomerate the hollow glass or thermosetting polymer beads with each other by adsorption of the solvent on the surface of the hollow glass or thermosetting polymer beads, and the solvent then being discharged from the mold.

This technique allows a dense stacking of the hollow glass or thermosetting polymer beads in the mold to be obtained. By virtue of the adsorption of the solvent on the surface of the hollow beads, the stacking of the hollow glass or thermosetting polymer beads is maintained during the filling of the mold with the slurry. Indeed, after discharge of the solvent, a small amount of solvent remains on the surface, which keeps the hollow glass or thermosetting polymer beads in a compact stack.

In some embodiments, the mold includes at least one liquid discharge port.

This discharge port may, for example, allow the liquid to be discharged from the slurry. In particular, this discharge port allows the use of a vacuum pump and accelerates the discharge of the liquid to form the green body of the ceramic part without handling of the part.

In some embodiments, the slurry comprises a pore-forming agent.

This pore-forming agent makes it possible to create, during the sintering heat treatment, in the ceramic material, additional porosity to the porosity generated from the hollow glass beads. It is thus possible to create additional porosity during the sintering heat treatment and thus to increase the total porosity of the ceramic layer with pores.

In some embodiments, the ceramic layer with pores has a porosity greater than or equal to 30% by volume, preferably greater than or equal to 40% by volume, preferably greater than or equal to 60% by volume, more preferably greater than or equal to 80% by volume.

This porosity is a total porosity which is made up of the open porosity and the closed porosity of the ceramic layer. This porosity is measured by triple weighing in accordance with the ISO 5017 standard for refractory materials.

In some embodiments, after the sintering heat treatment of the green body of the ceramic part, a slurry layer is applied to the ceramic layer with pores and a further sintering heat treatment is performed to sinter the slurry layer and form an additional ceramic layer having a porosity less than a porosity of the ceramic layer with pores and a roughness $R_a$ of less than or equal to 5 µm, preferably less than or equal to 3 µm, more preferably less than or equal to 1 µm.

This additional ceramic layer is less porous than the ceramic layer and has a relatively low roughness. The parameter used to characterize the roughness is the $R_a$ parameter, which is defined by the ISO 4287 standard and may be measured according to the ISO 4288 standard. When the additional ceramic layer is made of the same ceramic material as the ceramic layer with pores, the additional ceramic layer is then denser than the ceramic layer with pores.

Thus, as explained in the patent document FR 2 994 397 A1 on behalf of the applicant, the aerodynamic properties of the material are improved, which improves the energy efficiency of the turbomachine. This smooth layer does not significantly influence the mechanical properties of the abradable coating.

The present disclosure also relates to a porous abradable ceramic coating comprising a ceramic layer with pores, the ceramic layer having glass in pores of the ceramic layer.

For example, when the slurry includes a pore-forming agent, some pores in the ceramic layer with pores may be formed by the pore-forming agent and not include glass because these pores are not formed by the hollow glass or thermosetting polymer beads.

In some embodiments, the porous abradable ceramic coating comprises an additional ceramic layer having a porosity less than a porosity of the ceramic layer and a roughness $R_a$ less than or equal to 5 µm, preferably less than or equal to 3 µm, more preferably less than or equal to 1 µm.

In some embodiments, the additional layer of ceramic material has a thickness of less than or equal to 150 µm, preferably less than or equal to 100 µm, more preferably less than or equal to 50 µm.

This smooth layer does not significantly influence the mechanical properties of the abradable coating.

BRIEF DESCRIPTION OF THE DRAWINGS

Other features and advantages of the invention will emerge from the following description of embodiments of the invention, given by way of non-limiting examples, with reference to the appended figures, in which.

DETAILED DESCRIPTION OF THE INVENTION

Figure 1:
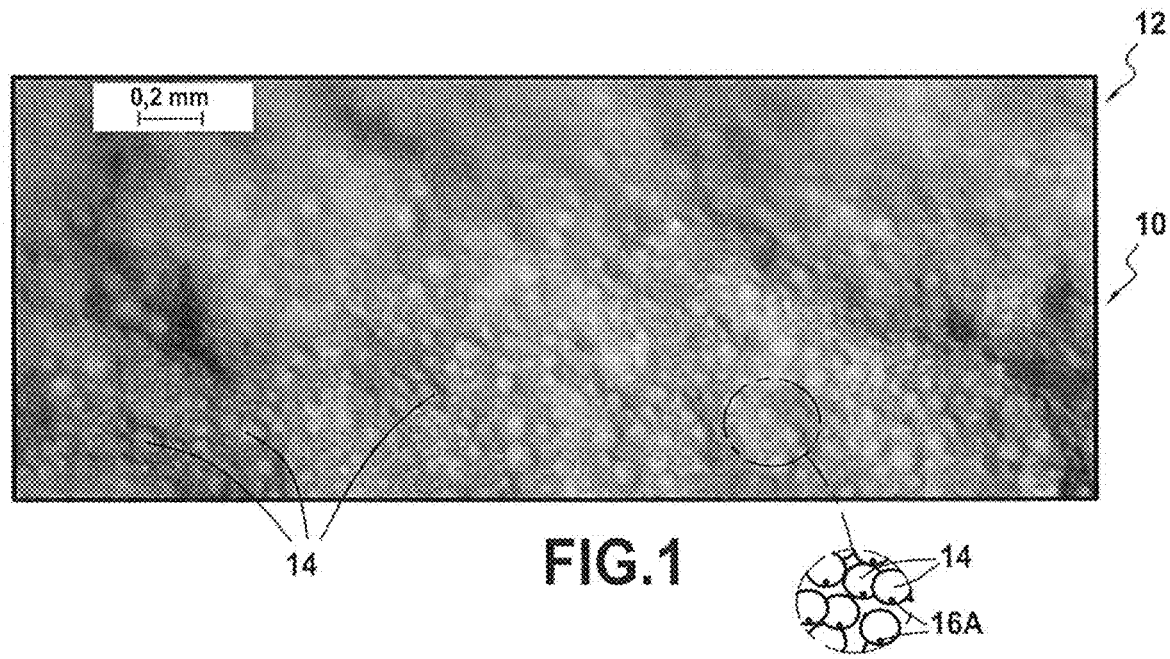
FIG. 1 is a view of a fracture face of an abradable coating according to the disclosure.

FIG. 1 is a view of a fracture face of a porous abradable ceramic coating 10. The porous abradable coating 10 includes a ceramic layer 12 having pores 14. As shown schematically in the enlargement of FIG. 1, the pores 14 of the layer 12 include glass 16A.

This glass 16A is present in the pores 14 of the ceramic layer 12 and results from the manufacturing process of the porous abradable coating 10. This glass 16A may be identified, for example, during analysis by X-ray fluorescence (XRF) spectroscopy. This technique makes it possible to identify elements present in the glass 16A that are not present in the ceramic material. The presence of the glass 16A may thus be identified.

This glass 16A comes from hollow glass beads 16B that are used to create porosity in the porous abradable coating 10. Hollow glass beads 16B that may be used in the manufacturing process of the porous abradable coating 10 are represented in FIG. 2.

The hollow glass beads 16B may be borosilicate glass, soda-lime glass, lead glass, also commonly referred to as crystal, silica glass or aluminosilicate glass.

The glass transition temperature is generally comprised between 550° C. and 600° C. for borosilicate glasses; between 450° C. and 480° C. for soda-lime glasses; between 400° C. and 420° C. for lead glasses; between 1300° C. and 1400° C. for aluminosilicate glasses and between 900 and 1300° C. for silica glass.

Figure 2:
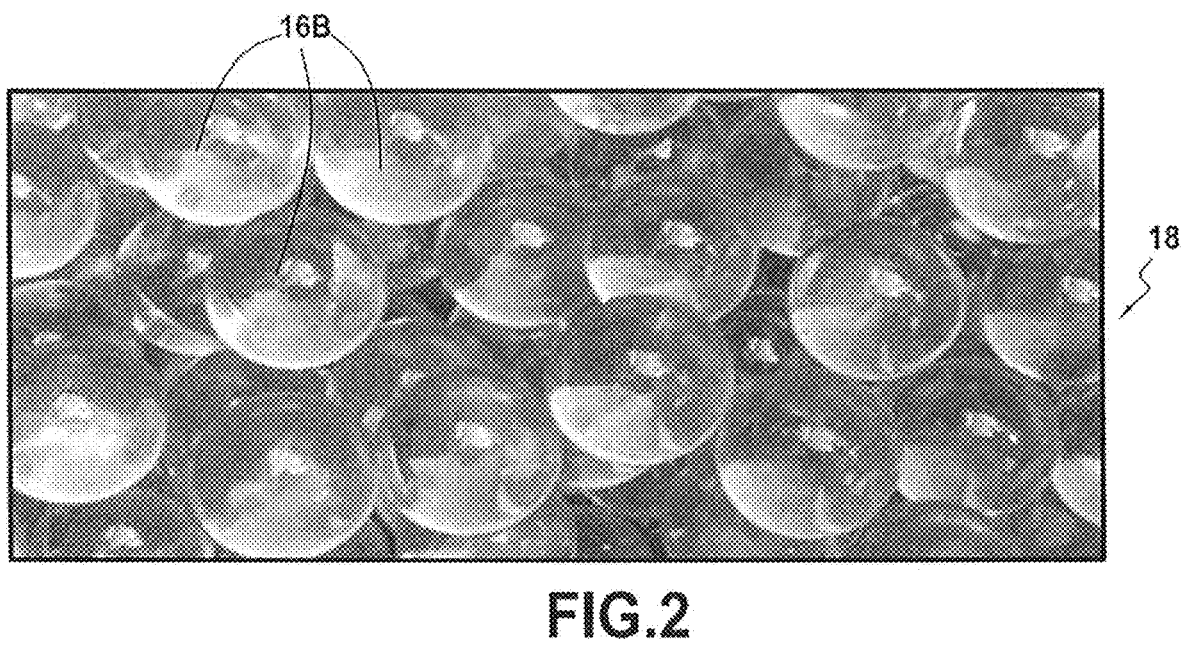
FIG. 2 is a schematic perspective view of a stack of hollow glass or thermosetting polymer beads.

The hollow glass beads 16B of FIG. 2 may for example have a diameter of about 100 µm (micrometers) and have a wall thickness comprised between about a few hundred nanometers and a few micrometers.

These hollow glass beads 16B may for example be made of borosilicate glass and have a glass transition temperature $T_g$ of about 800° C.

The hollow glass beads 16B may be obtained with a data sheet that indicates their glass transition temperature $T_g$. Alternatively, the glass transition temperature $T_g$ may be measured for example by differential scanning calorimetry (DSC).

In the embodiment of FIG. 1, the ceramic layer 12 with pores 14 has a total porosity of about 60% by volume.

The ceramic layer 12 may for example comprise alumina ($Al_2O_3$), zirconia ($ZrO_2$), yttrium disilicate ($Y_2Si_2O_7$) or silicon carbide (SiC), or a mixture of these compounds. This list is not limiting.

In the following, elements common to the various embodiments are identified by the same numerical references.

Figure 3:
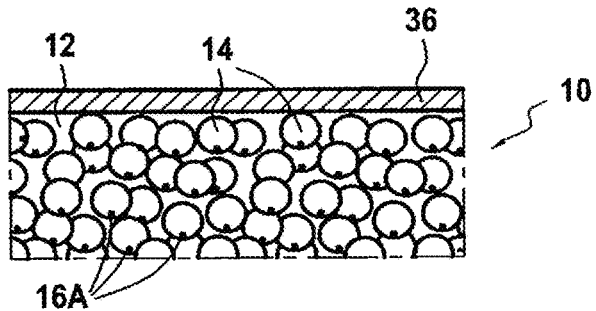
FIG. 3 is a schematic cross-sectional view of an abradable coating according to one variant of the disclosure.

In FIG. 3, another embodiment of a porous abradable coating 10 has been represented. In the embodiment of FIG. 3, the porous abradable coating 10 also includes an additional ceramic layer 36 having a porosity less than a porosity of the ceramic layer 12. The additional ceramic layer 36 has a roughness $R_a$ less than or equal to 5 µm.

The additional ceramic layer 36 has a thickness of 100 µm.

It is understood that when hollow thermosetting polymer beads 16B are used, there is no glass 16A present in pores of the porous abradable coating 10.

The porous abradable coating 10 of the embodiments of FIGS. 1 and 3 is obtained by the manufacturing process 100 which will be described below and illustrated in FIG. 4.

Figure 4:
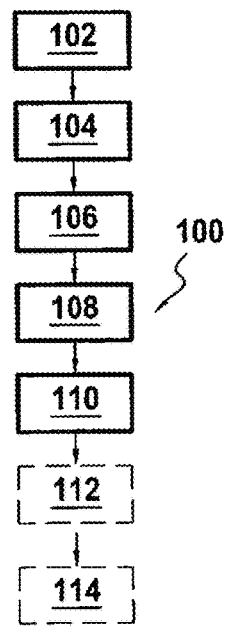
FIG. 4 is a flow chart representing the steps of a process for manufacturing the abradable coating of FIGS. 1 and 3.
Figure 5A:
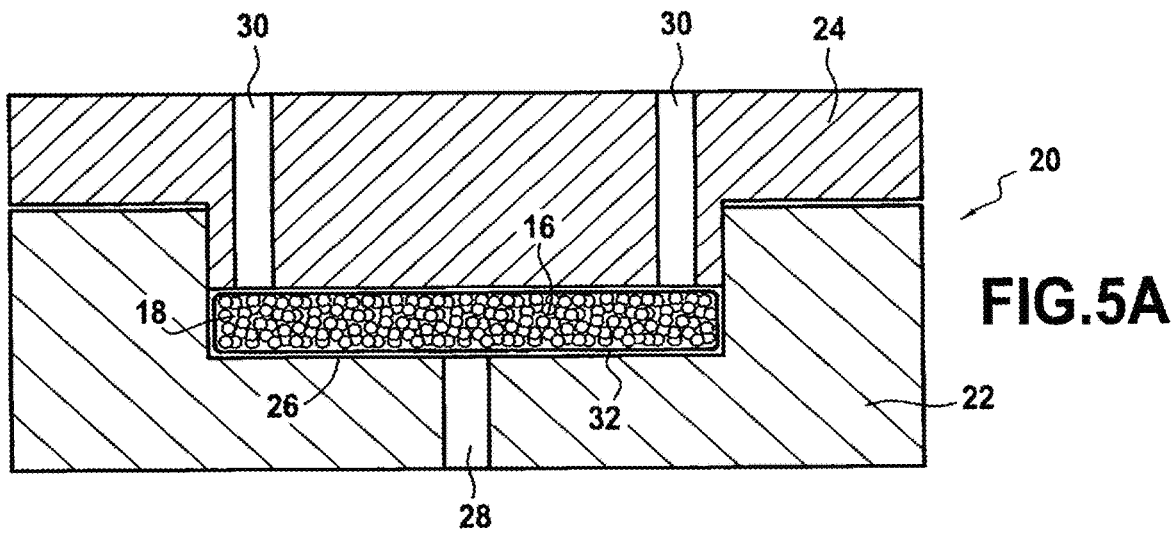
FIGS. 5A and 5B are schematic cross-sectional views of a mold for implementing a process for manufacturing the abradable coating.
Figure 5B:
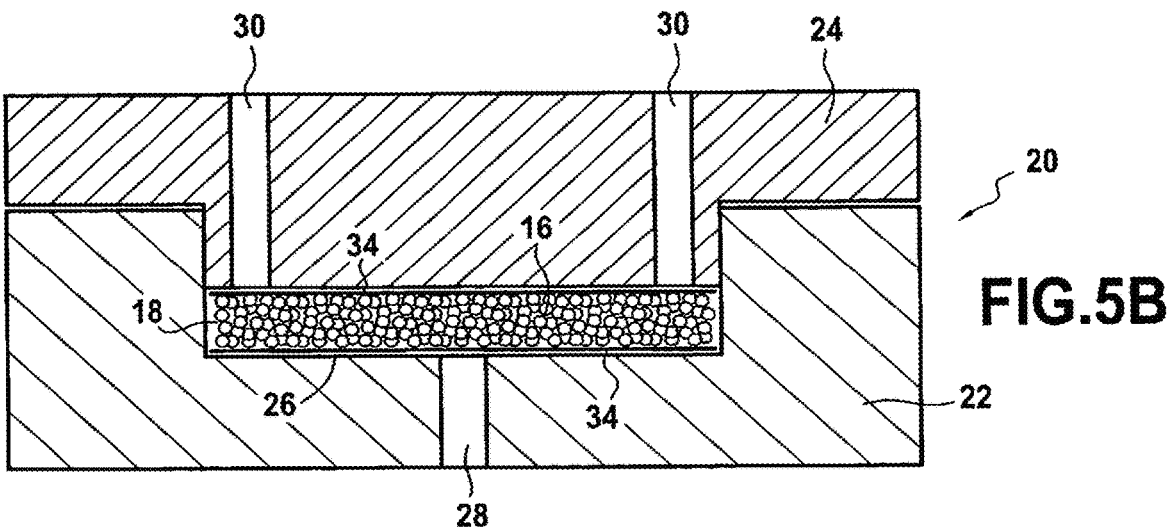

The manufacturing process 100 for the porous abradable coating 10 of FIG. 4 includes a first step 102 in which a mold 20 is filled with hollow glass beads 16B (see FIGS. 5A and 5B). The mold 20 has two parts: a lower part 22 and an upper part 24. When assembled, the lower part 22 and the upper part 24 of the mold 20 define a cavity 26 which is intended to receive the hollow glass beads 16B and a slurry intended to form the ceramic material of the ceramic layer 12 after heat treatment.

As represented in FIGS. 5A and 5B, the lower part 22 of the mold 20 has a discharge port 28 and the upper part 24 of the mold has two discharge ports 30. Alternatively, the lower part 22 and/or the upper part 24 of the mold 20 could be made of a porous material that allows for filtration and discharge of liquids from the mold 20. For example, the discharge ports 28, 30 in the lower and upper parts 22, 24 of the mold 20 may allow the liquid from the slurry to be discharged from the mold 20. In particular, these discharge ports 28, 30 allow a vacuum pump to be used and accelerate the discharge of the liquid to form a green body of the ceramic part without handling of the part. The discharge ports 28, 30 in the lower and upper parts 22, 24 of the mold 20 may also allow material to be introduced into the mold 20. For example, the discharge port 28 of the lower part of the mold 20 may be used to inject the slurry into the cavity 26 of the mold 20.

The cavity 26 of the mold 20 may be partially filled, i.e., over a given height of the cavity 26, a stack 18 of hollow glass beads 16B is present and over a height complementary to the given height of the cavity 26, the cavity does not include a stack of hollow glass beads 16B.

It is understood that when the cavity 26 is completely filled with the hollow glass beads 16B, there are gaps between the hollow glass beads 16B, gaps which will be filled by the slurry.

In the embodiment shown in FIG. 5A, the hollow glass beads 16B have for example a diameter of about 100 µm and the hollow glass beads 16B are disposed in a mesh 32. The mesh 32 has a mesh size to contain the hollow glass beads 16B and allow the slurry to pass through.

The mesh size of the mesh 32 is such that the hollow glass beads 16B are unable to exit the mesh 32, i.e., the mesh size is smaller than the diameter of the hollow glass beads 16B. However, the mesh size of the mesh 32 allows the slurry to seep between the hollow glass beads 16B, and more particularly into the spaces formed between the hollow glass beads 16B.

For example, the mesh 32 is flexible which allows the mesh 32 filled with hollow glass beads 16B to conform to the shape of the cavity 26 of the mold 20.

The mesh 32 also helps contain the hollow glass beads 16B in the cavity 26 when the mold 20 has discharge ports.

In the embodiment of FIG. 5B, the mold 20 has porous membranes 34 disposed in the cavity 26 of the mold 20 and the hollow glass beads 16B are disposed between these porous membranes 34. The porous membranes allow the hollow glass beads 16B to be contained within the cavity 26 when the mold 20 has discharge ports.

In the embodiment of FIG. 5B, the hollow glass beads 16B are disposed in the cavity 26 of the mold 20 with a solvent to agglomerate the hollow glass beads 16B with each other by adsorption of the solvent on the surface of the hollow glass beads 16B. The solvent is then discharged from the mold 20, for example through one of the discharge ports 28, 30. However, the adsorbed solvent remains on the surface of the hollow glass beads 16B which allows the hollow glass beads 16B to be maintained in a dense stack, even during the filling of the mold 20 with the slurry.

The manufacturing process 100 then includes a step of filling 104 the cavity 26 of the mold 20 with the slurry, for example, through the discharge port 28 of the lower part 22 of the mold 20. When the spaces between the hollow glass beads 16B are filled with the slurry, the discharge port 28 is closed.

Next, the step of filtering and discharging the solvent 106 from the slurry in the mold 20 to form a green body of the ceramic part comprising the hollow glass beads 16B is performed. During this solvent filtration and discharge step 106, the solvent is extracted from the slurry, for example by using a vacuum pump connected to one of the discharge ports 28, 30. This solvent filtration and discharge step 106 may last for more than 24 h (hours).

When the green body of the ceramic part has reached a proper moisture level, the green body of the ceramic part including the hollow glass beads 16B is placed in a furnace and undergoes a sintering heat treatment (steps 108 and 110) to obtain the ceramic layer 12 having the pores 14.

Figure 6:
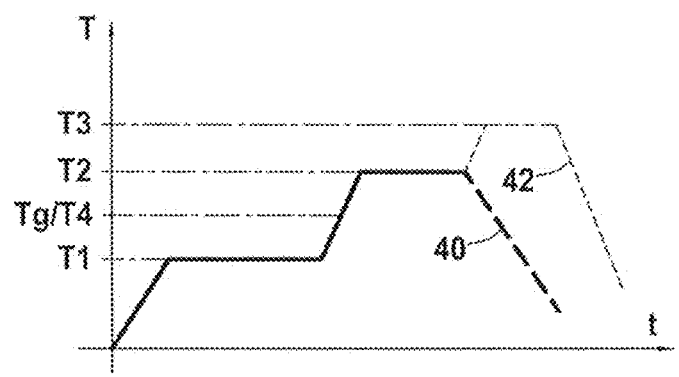
FIG. 6 is a graph showing temperature change versus time during the sintering heat treatment.

The heat treatment includes a first sintering stage (step 108) at a temperature T1, which is lower than the glass transition temperature $T_g$ of the hollow glass beads 16B (see FIG. 6).

After the first sintering stage at temperature T1, the green body of the ceramic part before heat treatment is partially consolidated and forms a partially consolidated ceramic part, with the ceramic material forming a partially consolidated structure around the hollow glass beads 16B. The temperature T1 being lower than the glass transition temperature $T_g$ of the hollow glass beads 16B, the hollow glass beads 16B do not soften under the effect of the temperature T1. Thus, the partial consolidation of the ceramic material around the hollow glass beads 16B is achieved around the hollow glass beads 16B which are not or only slightly deformed under the effect of the partial consolidation of the ceramic material around the hollow glass beads 16B.

The mesh 32 of FIG. 5A is made of a material with a decomposition temperature higher than the temperature T1 of the first temperature stage. Thus, during the partial consolidation of the ceramic material, the hollow glass beads 16B are held in place by the mesh 32, which is still present after the first sintering stage at temperature T1.

The mesh 32 is for example made of a material comprising a nylon.

The partially consolidated ceramic part is then heat treated in a second sintering stage (step 110) at a temperature T2, which is higher than the glass transition temperature $T_g$ of the hollow glass beads 16B. The temperature T2 is therefore higher than the temperature T1.

As shown in FIG. 6, the temperature T2 of the second sintering stage may be the final sintering temperature (curve 40) or the sintering heat treatment may comprise other sintering stages, at least one of which is at a temperature T3 higher than the temperature T2 of the second sintering stage (curve 42). The final sintering temperature is the maximum temperature imposed on the ceramic material in order to obtain the porous abradable ceramic coating 10.

The temperature T2 of the second sintering stage being higher than the glass transition temperature $T_g$ of the hollow glass beads 16B, the consolidation of the partially consolidated ceramic part continues and the hollow glass beads 16B soften.

As the hollow glass beads 16B soften, they leave cavities in the ceramic material. These cavities will form the pores 14 of the porous abradable coating 10. Thus, when the hollow glass beads 16B melt, the ceramic material is already sufficiently consolidated and the cavities left by the hollow glass beads 16B are not filled by the ceramic material.

When the sintering heat treatment is complete, a porous abradable ceramic coating 10 whose pores 14 include a small amount of glass 16A is obtained. The beads being hollow glass beads 16B, the wall of the hollow glass bead 16B being relatively thin, the amount of glass 16A remaining in the pores 14 is relatively small. The glass 16A present in the pores 14 of the ceramic layer 12 does not adversely affect the abradability of the porous abradable coating 10.

The mesh 32 material has the advantage of having a decomposition temperature that is lower than the final sintering temperature. Thus, at the end of the sintering process, the mesh 32 is decomposed and at most traces of carbon remain in the porous abradable ceramic coating 10 obtained at the end of the sintering heat treatment.

To obtain the porous abradable coating 10 of the embodiment of FIG. 3, the manufacturing process 10 comprises, after the sintering heat treatment of the green body of the ceramic part, an additional step 112 during which a layer of slurry is applied to the ceramic layer 12 comprising the pores 14.

The assembly formed by the ceramic layer 12 with the pores 14 and the slurry layer is then subjected to an additional sintering heat treatment 114 to sinter the slurry layer and form the additional ceramic layer 36.

In combination with the hollow glass beads 16B, the slurry may include a pore-forming agent that makes it possible, during the sintering heat treatment, to create, in the ceramic material, additional porosity to the porosity generated from the hollow glass beads 16B. Additional porosity may thus be created during the sintering heat treatment and thus increase the total porosity of the ceramic layer 12 comprising the pores 14. It is then understood that the glass 16A will not be present in all of the pores 14 of the ceramic layer 12.

Figure 7:
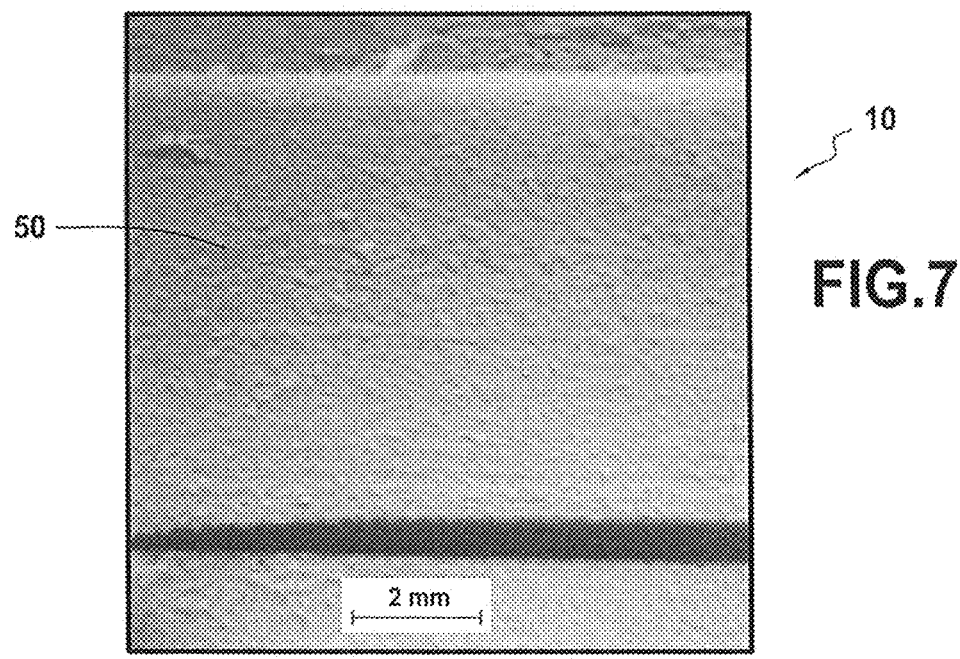
FIG. 7 is a perspective view of the result of an abrasion test carried out on an abradable coating according to the disclosure.

FIG. 7 presents the results of an abrasion test of a porous abradable coating 10 by a titanium-based alloy metal blade performed under standard test conditions. The porous abradable coating 10 was obtained by using an alumina slurry comprising 25% by volume alumina. The alumina slurry comprises water (solvent) and polyvinyl acetate. The hollow glass beads are made of borosilicate glass and have a diameter of about 100 µm. After filtration and discharge of the solvent, the green body of the ceramic part is heat treated with an intermediate stage at 80° C. for at least 2 h to dry the green body of the ceramic part. Then, the heat treatment includes a first sintering stage at a temperature T1 equal to 500° C. for 2 h, which is lower than the glass transition temperature $T_g$ of the hollow glass beads 16B which is about 800° C. The temperature rise to 500° C. is carried out at 15° C./min (degrees Celsius/minute). The heat treatment includes a second sintering stage at a temperature T2 equal to 1050° C. for 8 h. The temperature rise from 500° C. to 1050° C. is carried out at 10° C./min. The ceramic part is then cooled freely. The porosity obtained is about 60% by volume.

The standard test conditions are as follows: three TA6V blades with a thickness of 0.7 mm were rotated at a circumferential speed of 200 m/s (meters/second) with a penetration speed into the porous abradable coating 10 of 0.15 mm/s (millimeters/second) until a penetration depth into the porous abradable coating 10 that is equal to 1 mm is reached. The measured blade wear is less than 0.01 mm.

When using hollow beads 16B made of thermoplastic polymer, the manufacturing process described above in that the glass transition temperature $T_g$ of the hollow beads 16B made of glass is replaced by the decomposition temperature T4 of the hollow beads 16B made of thermoplastic polymer.

Although the present disclosure has been described with reference to a specific example embodiment, it is evident that various modifications and changes may be made to these examples without departing from the general scope of the invention as defined by the claims. Furthermore, individual features of the various embodiments discussed may be combined in additional embodiments. Consequently, the description and drawings should be considered in an illustrative rather than restrictive sense. It will be noted that the sintering heat treatment may include additional temperature stages at temperatures intermediate to temperatures T1, T2 and T3. It may also include temperature stages when cooling the porous abradable coating from the final sintering temperature to room temperature.

The invention claimed is:

1. A manufacturing process for a porous abradable coating made of ceramic material comprising a layer of ceramic material having pores, the manufacturing process comprising:
filling at least partially of a mold with hollow glass beads or hollow thermosetting polymer beads;
filling of the mold with a slurry;
filtration and discharge of a solvent from the slurry so that the mold contains a green body of the ceramic part comprising the hollow glass beads or the hollow thermosetting polymer beads;
sintering heat treatment of the green body of the ceramic part to obtain the layer of ceramic material having pores, a maximum sintering temperature of the green body of the ceramic part being either higher than the melting temperature of the hollow glass beads so that at the end of the sintering heat treatment the hollow glass beads are melted, or higher than the decomposition temperature of the hollow thermosetting polymer beads so that at the end of the sintering heat treatment, the hollow thermosetting polymer beads are decomposed.

2. The manufacturing process according to claim 1, wherein the heat treatment comprises at least two sintering stages, a first sintering stage at a temperature below a glass transition temperature of the hollow glass beads or below the decomposition temperature of the hollow thermosetting polymer beads to form a partially consolidated ceramic part and a second sintering stage at a temperature higher than the glass transition temperature of the hollow glass beads to melt the hollow glass beads or higher than the decomposition temperature of the hollow thermosetting polymer beads to decompose the hollow thermosetting polymer beads.

3. The manufacturing process according to claim 2, wherein during the at least partial filling of the mold with the hollow glass beads, the hollow glass beads are disposed in a mesh having a mesh size for containing the hollow glass beads or the hollow thermosetting polymer beads and for allowing the slurry to pass through, the mesh having a decomposition temperature below a final sintering temperature, the decomposition temperature of the mesh being higher than the temperature of the first sintering stage.

4. The manufacturing process according to claim 1, wherein, during the at least partial filling of the mold with the hollow glass beads, the hollow glass beads are disposed in a mesh having a mesh size for containing the hollow glass beads or the hollow thermosetting polymer beads and for allowing the slurry to pass through, the mesh having a decomposition temperature below a final sintering temperature.

5. The manufacturing process according to claim 4, wherein the mesh is made of a material comprising a nylon, a polyimide or a polyamide.

6. The manufacturing process according to claim 1, wherein, during the at least partial filling of the mold with the hollow beads or the hollow thermosetting polymer beads, the hollow glass beads or the hollow thermosetting polymer beads are disposed in the mold with a second solvent to agglomerate the hollow glass beads or the hollow thermosetting polymer bead with each other by adsorption of the second solvent on the surface of the hollow glass beads or the hollow thermosetting polymer beads, the second solvent then being discharged from the mold.

7. The manufacturing process according to claim 1, wherein the mold includes at least one liquid discharge port.

8. The manufacturing process according to claim 1, wherein the slurry comprises a pore-forming agent.

9. The manufacturing process according to claim 1, wherein the layer of ceramic material having pores has a porosity greater than or equal to 40% by volume.

10. The manufacturing process according to claim 9, wherein after the sintering heat treatment of the green body of the ceramic part, a slurry layer is applied to the layer of ceramic material having pores and a further sintering heat treatment is performed to sinter the slurry layer and form an additional ceramic layer having a porosity smaller than a porosity of the layer of ceramic material having pores and a roughness of less than or equal to 5 μm.

11. The manufacturing process according to claim 10, wherein the roughness of the additional ceramic layer is less than or equal to 3 μm.

12. The manufacturing process according to claim 10, wherein the roughness of the additional ceramic layer is less than or equal to 1 μm.

13. The manufacturing process according to claim 9, wherein the layer of ceramic material having pores has a porosity greater than or equal to 60% by volume.

14. The manufacturing process according to claim 9, wherein the layer of ceramic material having pores has a porosity greater than or equal to 80% by volume.

* * * * *